United States Patent [19]

Utsugi

[11] 4,027,500
[45] June 7, 1977

[54] AUTOMOBILE AIR CONDITIONER EVAPORATOR

[75] Inventor: Kazuo Utsugi, Kawagoe, Japan

[73] Assignee: Diesel Kiki Co., Ltd., Tokyo, Japan

[22] Filed: July 14, 1975

[21] Appl. No.: 595,988

[30] Foreign Application Priority Data

July 19, 1974 Japan ............... 49-85795[U]

[52] U.S. Cl. ..................... 62/519; 165/43
[51] Int. Cl.² ......................... F25B 39/02
[58] Field of Search ............. 165/43; 62/278, 515, 62/519, 95; 98/2.11

[56] References Cited

UNITED STATES PATENTS

| | | | |
|---|---|---|---|
| 1,955,837 | 4/1934 | Scholl | 62/515 X |
| 2,937,511 | 5/1960 | Mann | 62/278 X |
| 2,959,036 | 11/1960 | Mehalick | 62/95 X |
| 3,197,972 | 8/1965 | King | 62/519 X |

*Primary Examiner*—Ronald C. Capossela

*Attorney, Agent, or Firm*—Frank J. Jordan

[57] ABSTRACT

A fin and refrigerant tube assembly is mounted in a housing. The fins are arranged parallel to each other and the tube is doubled back on itself a number of times to perpendicularly extend through and be connected to the fins at a plurality of locations. The doubled over U-shaped ends of the tube extend external of the ends of the fin assembly. Air is forced from a main inlet through the fins parallel thereto to an outlet. The housing in conjunction with one end of the fin assembly defines a precooling chamber having a secondary air inlet and an outlet leading to the main inlet. Air passing through the precooling chamber is cooled by the doubled over ends of the tube and moisture condenses on the doubled over ends of the tube. Dust particles entrained in the air accumulate with the moisture on the doubled over ends of the tube rather than on fins whereby the spaces between the fins do not become clogged with dust.

5 Claims, 4 Drawing Figures

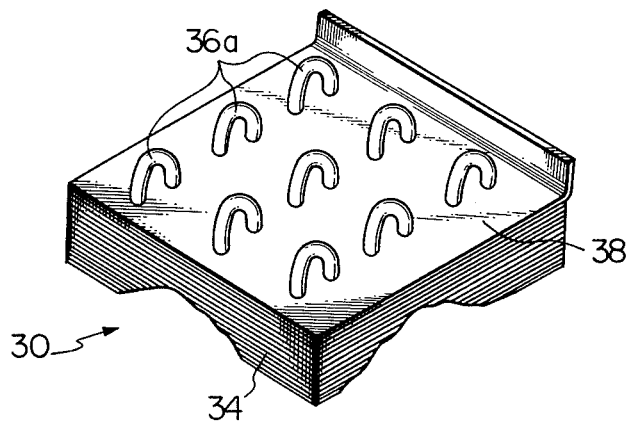
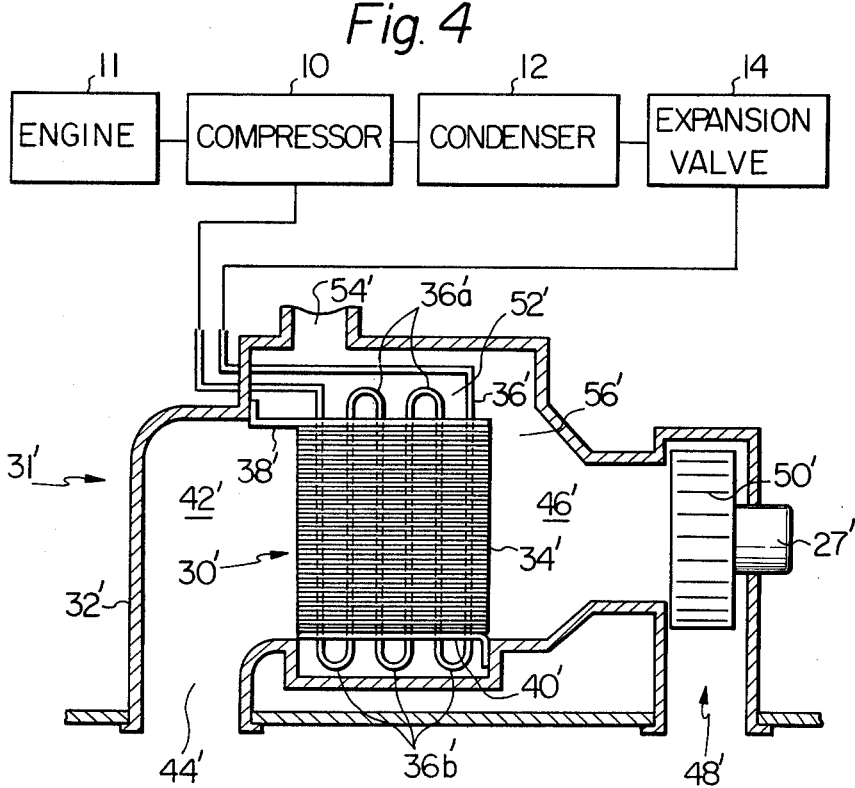

AUTOMOBILE AIR CONDITIONER EVAPORATOR

The present invention relates to an improved evaporator for an air conditioner of an automobile or other vehicle.

In an automobile air conditioner, it is desirable to recirculate occupant cabin air through the evaporator of the air conditioner to cool the air. Such a closed loop air conditioning system is much more efficient than an open loop system in which outside air is pumped through the evaporator into the cabin. A pure closed loop recirculation type air conditioning system is impractical, however, since the cabin air becomes polluted with the occupants' breath, fumes from the engine and other sources after a period of time causing eye irritation and other unpleasant effects. The cabin air becomes foul very guickly if one or more occupants smokes tobacco.

For this reason it is necessary to provide means for introducing a limited amount of outside air into the cabin. This outside air is typically introduced into the air flow duct of the air conditioner either upstream or downstream of the evaporator. It is advantageous to introduce the outside air upstream of the evaporator since it will be colled before entering the cabin.

A problem in this arrangement is that during the hot times of the year when the air conditioner is needed most, the outside air is of course hot. Considerable engine power is required to drive the air conditioner compressor to cool this incoming hot air, and the efficiency of this type of air conditioning system is intermediate between a true closed loop recirculation system and an open loop system.

Another problem with introducing outside air into the air conditioner is that dust particles are entrained in the air. If the outside air is introduced upstream of the evaporator the dust will accumulate in the spaces between the evaporator fins and will, in the worst case, clog the evaporator. If the outside air is introduced downstream of the evaporator the dust will be pumped into the cabin. Air filters have the effect of introducing resistance to the air flow so that the engine must produce more power to recirculate a specific volume of air.

It is therefore an object of the present invention to provide an evaporator for an air conditioner for a vehicle such as an automobile which provides precooling of air introduced from outside the vehicle without a significant increase in the power required to drive the air conditioner.

It is another object of the invention to provide an evaporator for an air conditioner that is more efficient than known evaporators of the same general type.

It is another object of the present invention to provide an evaporator for an air conditioner which is provided with means to prevent clogging thereof by dust particles without substantially introducing resistance to air flow through the evaporator.

It is another object of the present invention to provide an evaporator for an air conditioner which is provided with means to remove dust particles from air introduced thereinto.

The above and other objects, features and advantages of the present invention will become clear from the following detailed description taken with the accompanying drawings, in which:

FIG. 3 is a fragmentary perspective view of the evaporator shown in FIG. 2; and

FIG. 4 is a fragmentary schematic view of a modification of the embodiment shown in FIG. 2.

Figure 1:
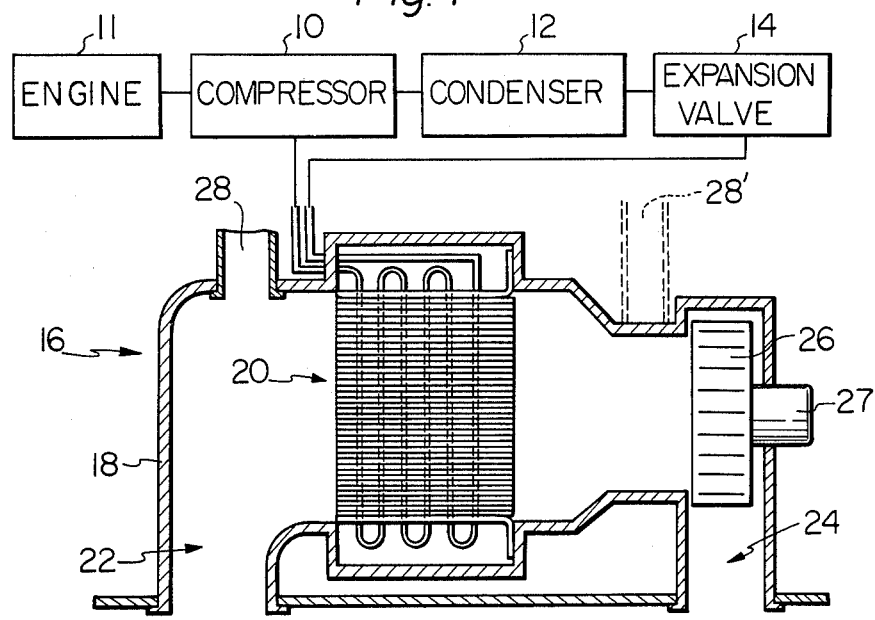
FIg. 1 is a schematic drawing of a prior art air conditioning system.

Referring now to FIG. 1, a typical prior art air conditioning system includes a compressor 10 driven by an engine 11 of a motor vehicle (not shown), the output of which is connected through a condenser 12 and an expansion valve 14 to an inlet of a cooling unit which is generally designated as 16. The outlet of the cooling unit 16 is connected to the inlet of the compressor 10. The cooling unit 16 includes a housing 18 to retain a fin and tube assembly, that is, an evaporator 20 which will be described in detail below with reference to the embodiments of the present invention. The housing 18 is formed with an air inlet 22 and an air outlet 24, both of which lead through suitable ducting to the vehicle cabin (not shown). The evaporator 20 is disposed in the housing 18 between the inlet 22 and outlet 24. A fan 26 driven by a motor 27 is located in the outlet 24 to force air through the housing 18 from the inlet 22 to the outlet 24. A secondary air inlet 28 opens into the inlet 22 upstream of the evaporator 20 and communicates with the atmosphere outside the vehicle. The secondary inlet 28 is provided to introduce fresh air into the air conditioning system to prevent the cabin air from becoming overly polluted as discussed above. Alternatively, a secondary inlet 28' may be provided opening into the outlet 24 downstream of the evaporator 20 as indicated in phantom line.

In operation the engine 11 drives the compressor 10 which compresses refrigerant fluid thereby raising the temperature of the fluid. The compressed fluid is forced by the compressor 10 into the condenser 12 where the fluid is cooled by radiating heat from the condenser 12. The refrigerant fluid is then expanded in the expansion valve 14 and thereby cools. The expanded fluid from the expansion valve 14 is introduced into the evaporator 20, from where it is returned to the compressor 10. Preferably, the refrigerant fluid is adapted to change from gaseous state to liquid state upon being compressed by the compressor 10 and change from liguid state to gaseous state in the expansion valve 14 to take advantage of the latent heat of vaporization of the refrigerant fluid. At any rate, the refrigerant fluid flowing through the evaporator 20 has a temperature well below the temperature of the air in the occupant cabin and thereby the fins and tube of the evaporator 20 are also very cold.

Air from the occupant cabin is forced by the fan 26 to flow into the inlet 22, and air from outside the vehicle also flows into the inlet 22 through the secondary inlet 28. This mixed air flows through the evaporator 20 which serves as a heat exchanger. The air flowing through the evaporator 20 gives up heat to the refrigerant fluid through the fins and tube and is therefore cooled to a comfortably low temperature. The air is forced by the fan 26 through the outlet 24 into the vehicle cabin to cool the occupants.

It will be noticed that air introduced through the secondary inlet 28 which contains entrained dust particles will pass directly through the evaporator 20 in such a manner that the dust will collect therein to clog the evaporator 20. Air introduced into the alternative secondary inlet 28' will be pumped directly into the vehicle cabin through the outlet 24 along with the dust particles intrained therein.

Figure 2:
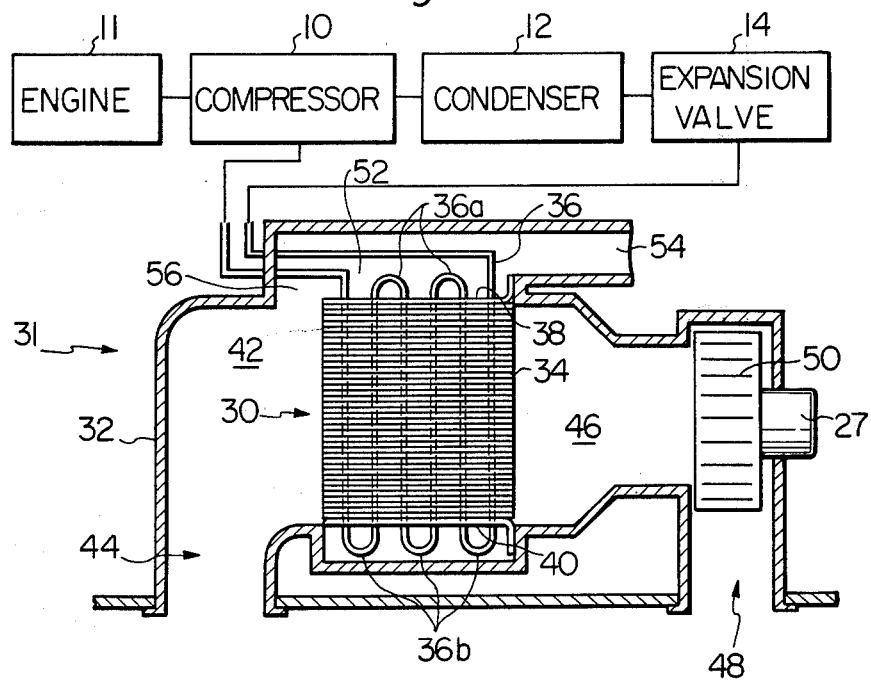
FIG. 2 is a schematic diagram of an air conditioning system incorporating an embodiment of an evaporator according to the present invention.

Referring now to FIG. 2 which shows a preferred embodiment of a cooling unit 31 of the present invention, the engine 11, compressor 10, condenser 12 and expansion valve 14 are identical to those shown in FIG. 1 and operate in an identical manner.

The embodiment of FIG. 2 comprises a fin and tube assembly, that is, an evaporator 30 fixedly mounted in housing 32. The evaporator 30 comprises a plurality of parallel fins collectively designated as a fin assembly 34 and a tube 36 which is connected at its opposite ends to the outlet of the expansion valve 14 and to the inlet of the compressor 10. The tube 36 is doubled back on itself a plurality of times and perpendicularly extends through and is connected to each of the fins of the fin assembly 34 at a plurality of locations. Doubled over upper ends 36a (as viewed in FIG. 2) of the tube 36 extend external of the upper end of the fin assembly 34 and doubled over lower ends 36b of the tube 36 extend external of the bottom end of the fin assembly 34. An end plate or flange 38 is provided to connect the upper end of the evaporator 30 to the housing 32 and an end plate or flange 40 is provided to connect the bottom end of the evaporator 30 to the housing 32. The tube 36 and the fins of the fin assembly 34 are made of a metal which has high thermal conductivity to provide maximum heat transfer between the refrigerant fluid and the air. The upper end of the evaporator 30 is shown in larger scale in FIG. 3.

The housing 32 and the left side (in FIg. 2) of the evaporator 30 define a main air inlet chamber 42 which communicates with the vehicle cabin through a main air inlet port 44. The right side of the evaporator 30 and the housing 32 define an outlet chamber 46 which communicates with the vehicle cabin through an outlet port 48. A fan 50 driven by the motor 27 is mounted in the outlet chamber 46 to force air through the housing 32 parallel to the fins of the fin assembly 34.

The upper wall of the housing 32 and the flange or end plate 38 of the evaporator 30 define a precooling chamber 52 which communicates with the air outside the occupant cabin through a secondary inlet port 54. The precooling chamber 52 further communicated with the inlet chamber 42 through an outlet 56.

In operation, cabin air is recirculated through the housing 32 and evaporator 30 by the fan 50 as described above with reference to the prior art. Outside air is sucked into the precooling chamber 52 through the secondary inlet 54 from which it flows through the outlet 56 and merges with the recirculating cabin air in the inlet chamber 42. In accordance with an important feature of the present invention, it will be noticed in FIG. 2 that the doubled over ends 36a protrude into the precooling chamber 52. These ends 36a of the tube 36 are cold and cool the air flowing through the precooling chamber 52. In addition, moisture in the air in the precooling chamber 52 condenses on the ends 36a and dust particles entrained in the air along with the moisture also collect on the ends 36a. In this manner, a significant amount of dust is removed from the air taken into the precooling chamber 52 so that it will not enter the spaces between the fins of the fin assembly 34 to clog the cooling unit 31. The upper portion of the housing 32 may be made detachable to facilitate cleaning of the ends 36a of the tube 36. One skilled in the art will immediately appreciate that it is easier to clean the ends 36a than the spaces between the fins of the fin assembly 34.

It has been found in practice that the cooling efficiency of the cooling unit 31 shown in FIG. 2 is significantly greater than the prior art cooling unit 16 shown in FIG. 1, and that the engine power required to compensate for the heat exchanged from the air in the precooling chamber 52 to the refrigerant fluid through the ends 36a of the tube 36 is negligible. The present invention therefore represents a novel improvement since the cooling effect of the doubled over ends 36a of the tube 36 which is wasted in the prior art cooling unit 16 is effectively utilized in the present cooling unit 31. The present invention also provides means for removing a significant amount of dust particled from air introduced from outside the vehicle cabin without resorting to a filter which would constitute a flow restriction.

FIG. 4 shows a modification to the embodiment shown in FIG. 2 and similar or like elements are designated by the same reference numerals suffixed by an apostrophe.

Whereas in FIG. 2 the precooling chamber 52 opens into the inlet chamber 42, in FIG. 4 the precooling chamber 52' opens into the outlet chamber 46'. A secondary inlet port 54' communicating with the air outside the occupant cabin opens into the precooling chamber 52' opposite to the outlet 56' which leads to the outlet chamber 46'. It is also possible to combine the embodiments of FIGS. 2 and 4 and have the precooling chamber open into both the inlet and outlet chambers if desired.

Many modifications within the scope of the present invention to the specific embodiment shown will become possible for those skilled after reciving the teachings of the present disclosure.

What is claimed is:

1. An air conditioner evaporator comprising:
    a fin assembly having a plurality of parallel fins;
    a refrigerant tube which is doubled back on itself a plurality of times and perpendicularly extends through and is connected to each of the fins at a plurality of different locations, the doubled over ends of the refrigerant tube extending external of the ends of the fin assembly;
    a housing to fixedly retain the fin assembly and refrigerant tube therein, the housing having a main air inlet communicating with one side of the fin assembly parallel to the fins and an air outlet communicating with another side of the fin assembly parallel to the fins;
    a fan mounted in the housing to force air therethrough; and a precooling chamber defined by the housing and one of the ends of the fin assembly and having a secondary air inlet and an outlet communicating with at least one of the main air inlet and air outlet , said doubled over ends of the refrigerant tube protruding into the precooling chamber.

2. The air conditioner evaporator according to claim 1, in which the main air inlet comprises a main inlet chamber defined by the housing and said one side of the fin assembly and an inlet port communicating with the main inlet chamber, the outlet of the precooling chamber communicating with the main inlet chamber.

3. The air conditioner evaporator according to claim 1, in which the air outlet comprises an outlet chamber defined by the housing and said other side of the fin assembly and an outlet port communicating with the outlet chamber, the fan being mounted in the outlet chamber.

4. The air conditioner evaporator according to claim 1, in which the fin assembly further comprises a flange to mount the fin assembly to the housing.

5. The air conditioner evaporator according to claim 4, in which the precooling chamber is defined by the housing, said one end of the fin assembly and the flange.

* * * * *